US006876922B2

(12) United States Patent
Nagaki

(10) Patent No.: US 6,876,922 B2
(45) Date of Patent: Apr. 5, 2005

(54) NAVIGATION SYSTEM

(75) Inventor: Koichi Nagaki, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/734,678

(22) Filed: Dec. 13, 2000

(65) Prior Publication Data

US 2001/0004724 A1 Jun. 21, 2001

(30) Foreign Application Priority Data

Dec. 13, 1999 (JP) .......................................... P11-353632

(51) Int. Cl.$^7$ .......................... G01C 21/20; G08G 1/123
(52) U.S. Cl. .................... 701/208; 701/207; 340/990
(58) Field of Search ........................... 701/207, 208, 701/209, 212, 200, 213; 340/990, 995; 73/178 R; 707/104.1, 102

(56) References Cited

U.S. PATENT DOCUMENTS

| | | | | |
|---|---|---|---|---|
| 4,737,927 A | * | 4/1988 | Hanabusa et al. | 364/443 |
| 5,406,493 A | * | 4/1995 | Goto et al. | 364/449 |
| 5,680,640 A | * | 10/1997 | Ofek et al. | 395/839 |
| 5,742,924 A | * | 4/1998 | Nakayama | 701/208 |
| 5,884,218 A | * | 3/1999 | Nimura et al. | 701/208 |
| 6,075,467 A | * | 6/2000 | Ninagawa | 340/995.14 |
| 6,125,367 A | * | 9/2000 | Na | 707/104 |
| 6,175,802 B1 | * | 1/2001 | Okude et al. | 701/208 |
| 6,230,098 B1 | * | 5/2001 | Ando et al. | 701/208 |
| 6,246,958 B1 | * | 6/2001 | Hirono | 701/208 |
| 6,304,212 B1 | * | 10/2001 | Aoki et al. | 342/357.13 |
| 6,304,819 B1 | * | 10/2001 | Agnew et al. | 701/207 |

FOREIGN PATENT DOCUMENTS

| | | |
|---|---|---|
| DE | 19837618 A1 | 3/1999 |
| JP | 10-255022 | 9/1998 |

* cited by examiner

*Primary Examiner*—Tan Q. Nguyen
*Assistant Examiner*—Dalena Tran
(74) *Attorney, Agent, or Firm*—Morgan Lewis & Bockius LLP

(57) ABSTRACT

A first navigation system is provided with: a present position detecting device (16, 17) for detecting a present position; a plurality of memory devices (14, 15) each capable of reading out map data which is recorded therein; a navigation controlling device (11) for controlling a navigation operation in correspondence with the detected present position by using the map data; and a map data reading device (11) for accessing one of the memory devices, which is selected in accordance with a predetermined condition, and reading out the map data required for the navigation operation therefrom.

17 Claims, 11 Drawing Sheets

FIG. 2
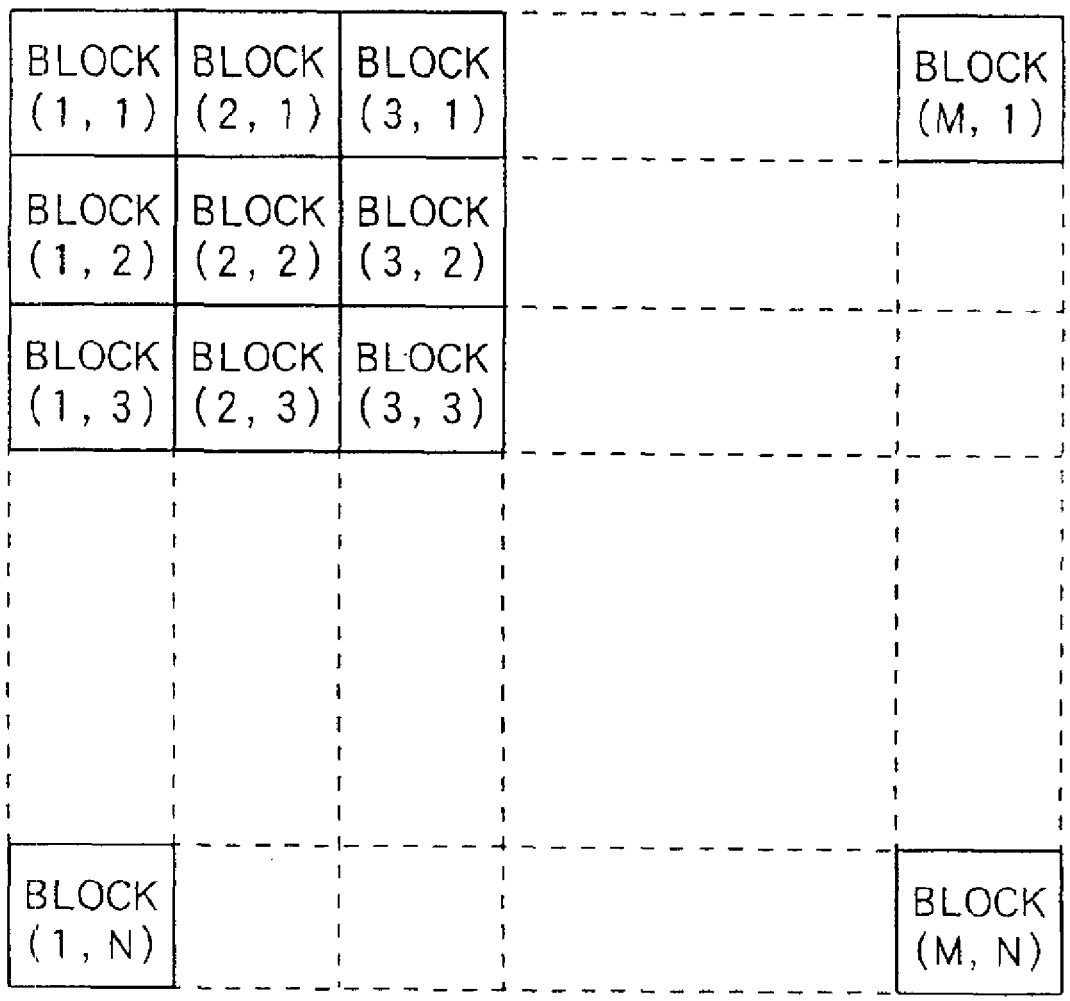
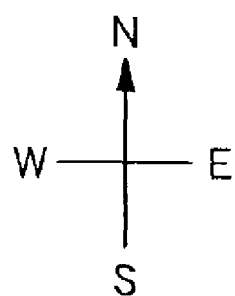

FIG. 3

| DATA ORDER | BLOCK MAP DATA NAME |
|---|---|
| 1 | BLOCK (1, 1) |
| 2 | BLOCK (2, 1) |
| 3 | BLOCK (3, 1) |
| ⋮ | ⋮ |
| M | BLOCK (M, 1) |
| M+1 | BLOCK (1, 2) |
| M+2 | BLOCK (2, 2) |
| M+3 | BLOCK (3, 2) |
| ⋮ | ⋮ |
| 2M+1 | BLOCK (1, 3) |
| 2M+2 | BLOCK (2, 3) |
| 2M+3 | BLOCK (3, 3) |
| ⋮ | ⋮ |
| M(N−1)+1 | BLOCK (1, N) |
| ⋮ | ⋮ |
| M−N | BLOCK (M, N) |

NAVIGATION SYSTEM

BACKGROUND OF THE INVENTION

1. Field of the Invention

The present invention relates to a navigation system for carrying out a navigation operation by using map data which is recorded in a record medium, and more particularly relates to a navigation system, which can selectively read the map data from a plurality of memory devices each capable of reading out the map data.

2. Description of the Related Art

There is a navigation system, which has a DVD-ROM (DVD-Read Only Memory) drive or a CD-ROM (Compact Disc—Read Only Memory) drive, reads map data stored in a DVD-ROM or a CD-ROM as a record medium, and carries out a navigation operation. When carrying out the navigation operation, the navigation system detects a self-car position, reads the map data around the car from the record medium, and then displays a map picture generated on the basis of the map data together with a mark indicative of the self-car position on a display screen.

On the other hand, it may be considered that the navigation system is equipped with, for example, a hard disc, as a non-volatile memory having a large capacity, besides the record medium. If the map data of the DVD-ROM or the like is installed in the hard disc, and then the map data is read from the hard disc at a time of the navigation operation, the DVD-ROM or the like can be used for another purpose. Also, since an access speed for the hard disc is very fast, this has a merit from the viewpoint of a fast drawing on a display screen.

By the way, a record medium such as a DVD-ROM or the like is available in which music data and video data are recorded in a format of DVD-Video or DVD-Audio. Thus, it is desired to perform a reproduction of such a record medium during a car driving operation. However, the above-mentioned navigation system requires that the record medium in which the map data is stored is always inserted in the DVD-ROM drive or the like during the navigation operation. Namely, the DVD-ROM drive or the like is occupied by the record medium for the navigation operation. Hence, it is difficult to use the DVD-ROM drive or the like for another purpose such as a reproduction of the music data or video data.

On the other hand, it may be considered that the navigation system is equipped with, for example, a hard disc, as a non-volatile memory having a large capacity, besides the record medium. If the entire data of the DVD-ROM or the like is perfectly installed in the hard disc, and then the map data is read from the hard disc at a time of the navigation operation, the DVD-ROM or the like can be used for another purpose. Also, since an access speed for the hard disc is very fast, this has a merit from the viewpoint of a fast drawing on a display screen.

However, if the navigation system is constructed such that the map data can be selectively read from one of the hard disc and the DVD-ROM or the like, there may be a possibility that the map data for the same area redundantly exist in both of them. At this time, the data contents of the map data stored in them may not be same to each other. For example, there may be a case that the latest map data is stored in the DVD-ROM while the old map data stored in the past is still maintained in the hard disc without updating. In such a case, if the old map data is used for the navigation, a situation may arise that the map data does not reflect the actual road circumstance around the self-car, resulting in that the appropriate navigation cannot be performed.

Further, even if the navigation system is constructed such that the map data can be selectively read from one of the hard disc and the DVD-ROM or the like, the user may want to use the DVD-ROM or the like, in which the special version of map data including useful information is stored, to thereby perform the navigation.

In this manner, even if the map data can be read from a plurality of memory devices, it is difficult to select the optimum memory device from among them and then read the map data from the selected memory device.

SUMMARY OF THE INVENTION

The present invention is proposed in view of the above mentioned problems. It is therefore an object of the present invention to provide a navigation system, which has a plurality of memory devices each capable of reading out the map data and can access the optimum memory device among them when reading the map data required for the navigation operation, so that the user's operation can be easily and comfortably performed.

The above object of the present invention can be achieved by a first navigation system provided with: a present position detecting device for detecting a present position; a plurality of memory devices each capable of reading out map data which is recorded therein; a navigation controlling device for controlling a navigation operation in correspondence with the detected present position by using the map data; and a map data reading device for accessing one of the memory devices, which is selected in accordance with a predetermined condition, and reading out the map data required for the navigation operation therefrom.

According to the first navigation system of the present invention, from a plurality of memory devices such as an optical disc e.g., a DVD-ROM, a CD-ROM, a hard disc and the like, the map data can be respectively read out. When performing the navigation operation in correspondence with the present position detected by the present position detecting device, one of the memory devices is selected in accordance with the predetermined condition, so that the selected memory device is accessed, and the map data required for the navigation operation is read out by the map data reading device. Then, the read out map data is used for the displaying process etc., for the navigation operation.

Therefore, since the map data is redundantly held by the memory devices, it is not necessary to occupy each memory device during the navigation operation. Further, if many map data corresponding to the same district are held by the memory devices, it is possible to selectively use one map data among them, which is optimum for the navigation operation. Consequently, it is possible to realize the navigation operation, which is highly convenient for the user.

In one aspect of the first navigation system of the present invention, the map data reading device selects the memory device to be accessed, which is indicated by a priority flag set in advance.

According to this aspect, the priority flag is set in advance by a predetermined operation etc., by the user for example. Then, the priority flag is referred to, and one of the memory devices from which the map data is to be read out is selected by the map data reading device. Therefore, it is possible to deal with such a navigation operation that the map data corresponding to a certain usage is used, by fixedly reading out a certain memory device.

In another aspect of the first navigation system of the present invention, the map data reading device selects the memory device to be accessed, which is capable of reading out the map data updated at the latest.

According to this aspect, the map data reading device judges the updated date and time recorded in the memory devices, and selectively accesses the memory device, whose updated date and time is the latest, to thereby read out the map data therefrom. Therefore, even if the map data is updated one after another so that there exist many map data whose freshness degrees with respect to a certain district (i.e., the recencies of the map data) are different from each other, it is still possible to selectively use the latest map data among them.

In another aspect of the first navigation system of the present invention, the map data reading device selects the memory device to be accessed, in accordance with management information of the map data stored in the memory devices.

According to this aspect, each memory device has the management information of the map data. The map data reading device refers to the respective management information, and selectively accesses a certain memory device on the basis of the management information, to thereby read out the map data therefrom. Therefore, by comparing the management information of one memory device with that of another memory device, it is possible to easily select one of the memory devices, from which the map data is to be read out.

In this aspect, the navigation system may be further provided with a management information storage device for extracting the management information from the memory devices and holding the extracted management information respectively.

By constituting in this manner, a plurality of the management information of the memory devices are totally managed by the management information storing device. The map data reading device refers to the management information stored in the management information storage device and selectively accesses the memory device from which the map data is to be read out. Therefore, it is not necessary for the map data reading device to refer to the management areas individually, in correspondence with the respective memory devices. Consequently, it is possible for the map data reading device to easily and speedily access the memory device.

In this case, the management information storage device may hold name information indicative of a name of the map data, and the map data reading device may select the memory device to be accessed, in which a presence of the map data is confirmed in accordance with the name information.

By constituting in this manner, the map data reading device refers to the name information with respect to the map data among the management information totally stored in the management information storage device. Then, after confirming the presence of the map data in a certain memory device on the basis of the name information, the map data reading device reads out the desired map data therefrom. Therefore, even if there is no common map data between the memory devices, it is possible to use the desired map data by finding it out by virtue of the name information.

Alternatively in this case, the management information storage device may hold date and time information indicative of date and time when the map data is updated, and the map data reading device may select the memory device to be accessed, which is capable of reading out the map data corresponding to the date and time information indicative of latest date and time.

By constituting in this manner, the map data reading device refers to the date and time information among the management information totally stored in the management information storage device. Then, it is possible for the map data reading device to find out the memory device in which the latest map data is stored and then access it, on the basis of the date and time information. Therefore, even if there exist a plurality of map data in different versions such that the date and time of one map data is different from that of another map data between the memory devices, it is possible to use the latest map data by easily finding it out by virtue of the date and time information.

In another aspect of the first navigation system of the present invention, the navigation system may be further provided with a differential management information storage device for extracting the management information from the memory devices and holding differential management information indicative of a difference between the management information extracted from one memory device and that extracted from another memory device, wherein the map data reading device selects the memory device to be accessed in accordance with the differential management information.

According to this aspect, the map data reading device refers to the differential management information stored in the differential management information storage device, and judges the difference between the management information in one memory device and that in another memory device on the basis of the differential management information, to thereby select the memory device to be accessed for reading out the map data. Therefore, it is not necessary to hold a common or same portion of the management information of the memory devices in the management information storage device upon reading out the map data. Thus, it is possible to use the map data in the above described manner with a less memory capacity and at a higher processing speed.

The above object of the present invention can be also achieved by a second navigation system provided with: a present position detecting device for detecting a present position; a first memory device capable of reading out map data from a record medium in which the map data is recorded; a second memory device of non-volatile type, capable of reading out the map data therefrom and writing the map data thereinto; a navigation controlling device for controlling a navigation operation in correspondence with the detected present position by using the map data; a map data transferring device for controlling the first memory device to read out the map data from the record medium at a predetermined timing, and then transferring and storing the read out map data to the second memory device; and a map data reading device for selecting one of the first and second memory devices in accordance with a predetermined condition, accessing the selected one of the first and second memory devices and reading out the map data required for the navigation operation therefrom.

According to the second navigation system of the present invention, there are provided with the first memory device using a record medium such as an optical disc e.g., a DVD-ROM, a CD-ROM, and the second memory device such as a hard disc and the like. In operation, the map data is read out from the first memory device at the predetermined timing and is transferred to the second memory device. Also, when performing the navigation operation in correspondence with the present position detected by the present position detecting device, one of the first and second memory devices is selected in accordance with the predetermined condition, so that the selected memory device is accessed, and the map data required for the navigation operation is read out by the map data reading device. Then, the read out map data is used for the displaying process etc., for the navigation operation.

Therefore, once the map data is transferred to the second memory device, the navigation operation can be continued even if the record medium for the map data is not always set to the first memory device. Further, even if the types and/or freshness degrees of the map data in the first memory device and the map data in the second memory device are different from each other, it is possible to selectively use the appropriate map data. Consequently, it is possible to realize the navigation operation, which is highly convenient for the user.

In one aspect of the second navigation system of the present invention, the navigation system is further provided with a management information storage device for extracting management information of the map data in the first memory device and management information of the map data in the second memory device, and holding the extracted management information respectively, wherein the map data transferring device selects the map data to be transferred in accordance with the management information, and the map data reading device selects one of the first and second memory devices in accordance with the management information.

According to this aspect, the management information of the map data in the first memory device and the management information of the map data in the second memory device are totally stored in the management information storage device. With referring to the management information, the map data to be transferred is selected upon transferring the map data, and one of the first and second memory devices to be accessed is selected upon reading out the map data. Therefore, it is possible to easily and speedily use the map data without individually accessing the management area in the DVD-ROM and the management area in the hard disc for example.

In this aspect, the management information storage device may hold name information indicative of a name of the map data, and the map data transferring device may compare the name information of the map data in the first memory device with that in the second memory device, and may select the map data, which is not stored in the second memory device, as the map data to be transferred.

By constituting in this manner, the map data reading device refers to the name information with respect to the map data among the management information totally stored in the management information storage device. Then, upon transferring the map data, the map data to be transferred is selected after confirming the presence thereof on the basis of the name information. Upon reading out the map data, one of the first and second memories to be accessed is selected after confirming the presence of the map data stored in the first and second memory devices, on the basis of the name information. Therefore, even if there is no common map data between the first and second memory devices, it is possible to efficiently use the map data.

Alternatively in this aspect, the management information storage device may hold date and time information indicative of date and time when the map data is updated, and the map data transferring device may compare the date and time information of the map data in the first memory device with that in the second memory device, and may select the map data, whose date and time in the second memory device is older than that in the first memory device, as the map data to be transferred.

By constituting in this manner, the map data reading device refers to the date and time information among the management information totally stored in the management information storage device. Then, upon transferring the map data, the latest map data is selected on the basis of the date and time information. Upon reading out the map data, one of the first and second memories to be accessed is selected depending upon the oldness and newness of the map data stored in the first and second memory devices, on the basis of the date and time information. Therefore, even if there exist a plurality of map data in different versions such that the update date and time of one map data is different from that of another map data between the first and second memory devices, it is possible to use the latest map data. Further, if the map data in the second memory device is older, it is possible to replace it by the new map data.

In another aspect of the second navigation system of the present invention, the map data transferring device transfers the map data when the record medium is set to the first memory device.

According to this aspect, when the record medium is set to the first memory device, the map data transferring deice reads out the map data, and then transfers and stores it to the second memory device in the above described manner. Therefore, even if the record medium recorded with the map data, which is updated from the old map data in the past, is used, it is possible to replace the content of the second memory device i.e., the old map data by the new map data.

In another aspect of the second navigation system of the present invention, the second memory device is capable of writing and reading the map data at an access speed faster than that of the first memory device.

According to this aspect, since the access speed of the second memory device is higher than that of the first memory device, it is possible to read out the map data from the second memory device for a shorter time period after the map data is transferred, so that the speedy navigation operation can be performed.

In this aspect, the second memory device may include a hard disc device.

By constituting in this manner, since the hard disc device is used as the second memory device, it is possible to utilize the second memory device by transferring the map data to the second memory device, which is speedily accessible, which has a large storage capacity and whose flexibility is high.

In another aspect of the second navigation system of the present invention, a plurality of block map data, which are obtained by dividing a whole map for each unit block, are recorded in the record medium, the map data transferring device transfers the block map data, and the map data reading device reads the block map data.

According to this aspect, since the map data recorded in the record medium comprises a set of the block map data as for each unit block, which are obtained by dividing the whole map for each unit block. Then, the first and second memory devices perform the transferring process and/or the accessing device with respect to the respective block map data as one unit. Therefore, by treating the map data such that one file is assigned to the map data for each unit block, it is possible to even more easily perform the reading process and the writing process.

The above object of the present invention can be also achieved by a third navigation system provided with: a present position detecting device for detecting a present position; a first memory device capable of reading out map data from a record medium in which the map data is recorded; a second memory device of non-volatile type, capable of reading out the map data therefrom and writing the map data thereinto; a navigation controlling device for controlling a navigation operation in correspondence with the detected present position by using the map data; a differential management information generating device for comparing management information of the map data in the first memory device with management information of the map data in the second memory device at a predetermined timing, and generating differential management information indicative of a difference between the compared management informations; a differential management information storing device for storing the generated differential management information; and a map data reading device for selecting one of the first and second memory devices in accordance with the differential management information, accessing the selected one of the first and second memory devices and reading out the map data required for the navigation operation therefrom.

According to the third navigation system of the present invention, there are provided with the first and second memory devices in the same manner as the above described second navigation system of the present invention. In operation, the management information in the first memory device and the management information in the second memory device are accessed at the predetermined timing, and the differential management information is generated by the comparison of them. Then, the generated differential management information is stored in the differential management storage device. Also, when performing the navigation operation in correspondence with the present position detected by the present position detecting device, the differential management information is read out. Then, on the basis of the differential management information, one of the first and second memory devices is selectively accessed. Then, the map data required for the navigation operation is read out from the selected memory device, and is used for the navigation operation such as a displaying process or the like.

Therefore, since it is enough to hold only the different portion between the management information in the first memory device and that in the second memory device, it is it is possible to use the map data in the above described manner with a less memory capacity and at a higher processing speed.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 2 is a diagram explaining a concept of a block as a division unit of map data in the embodiment;

FIG. 3 is a diagram showing an example of a data structure when the map data is recorded in a DVD-ROM in the embodiment;

DETAILED DESCRIPTION OF THE PREFERRED EMBODIMENTS

Preferred embodiments of the present invention will be explained below with reference to the drawings.

Figure 1:
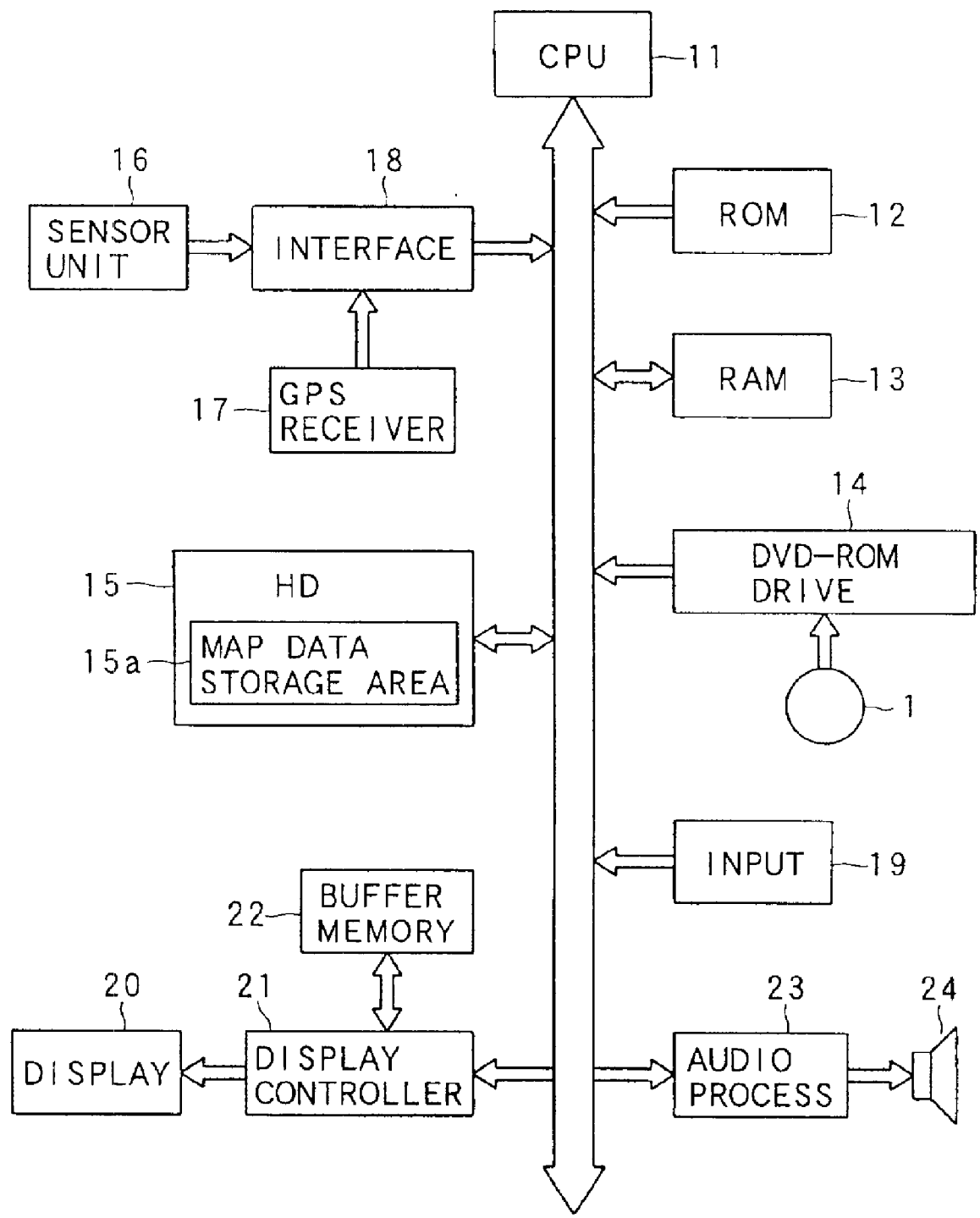
FIG. 1 is a block diagram showing an entire configuration of a navigation system as an embodiment of the present invention.

FIG. 1 is a block diagram showing the entire configuration of a navigation system as the embodiment. The navigation system shown in FIG. 1 is provided with a CPU 11, a ROM 12, a RAM 13, a DVD-ROM drive 14, a hard disc 15, a sensor unit 16, a GPS receiver 17, an interface 18, an input device 19, a display device 20, a display controller 21, a buffer memory 22, an audio process circuit 23 and a speaker 24.

In FIG. 1, the CPU 11 controls the entire operation of the navigation system. The CPU 11 is connected through an inner bus to the respective constitutional elements of the navigation system. The CPU 11 reads a control program stored in the ROM 12 through the inner bus. The CPU 11 carries out the control program while transiently storing data, which is currently being processed, into the RAM 13. The CPU 11 functions as examples of a map data reading device, a navigation controlling device and a map data transferring device of the present invention.

The DVD-ROM drive 14 functions as one example of a first memory device of the present invention, contains a DVD-ROM 1 for storing the map data, and carries out an operation of reading the map data. The DVD-ROM 1 is a record medium having a large storage capacity, such as 4.7 Gigabytes in case of the one-surface one layer type and 8.5 Gigabytes in case of the one-surface two-layer type. Pits corresponding to the record data are formed on the DVD-ROM 1. The record data is read by using an optical pickup of the DVD-ROM drive 14. The DVD-ROM 14 detects the setting or loading condition of the DVD-ROM 1 thereto and outputs a detection signal corresponding to it.

The DVD-ROM 1 stores therein the map data including road situation data necessary for a navigation operation. Moreover, various related data, such as related facility data, name data and the like are stored while they are correlated with the road situation data. In this embodiment, the entire map is divided into blocks, as meshed unit areas. The map data corresponding to each block is managed as each "block map data". A plurality of block map data are recorded in the DVD-ROM 1.

FIG. 2 is a diagram explaining a concept of the block serving as a division unit of the map data in the DVD-ROM 1. As shown in FIG. 2, the map data of the DVD-ROM 1 is divided into respective meshed blocks, such that the entire area on the map is divided into M blocks in the east and west directions and N blocks in the south and north directions, and is managed. In FIG. 2, a block (i, j) is defined as a block at a grid i from the west and at a grid j from the north. A total of M×N blocks having the same shape are gathered from a block (1,1) in the northwest corner to a block (M, N) in the southeast corner, and constitute the entire map data.

In FIG. 2, it is described that the entire area on the map is rectangular, and further, a block at each unit is also a rectangular area. Actually, there may be a case of dealing with a map having a complex entire shape. So, the shapes of the respective blocks are not limited to the same shape. In the following explanation, it is assumed that the respective blocks are the rectangular areas having the same shape, for the purpose of easy illustration. However, the present invention can be applied to a case that the shape of the block is more complex.

FIG. 3 is a diagram showing an example of a data structure when the map data at each block unit shown in FIG. 2 is recorded in the DVD-ROM 1. In FIG. 3, each block map data includes the road situation data of each block and the related data associated with it. A particular name is given to each block map data at each block, so as to be identified. A plurality of block map data are sequentially arranged and recorded in the DVD-ROM 1, as for the respective M×N blocks. A data order of the block map data shown in FIG. 3 is only one example. They may be stored in a data order different from it. Also, they may be stored in a different storage area for each data type of each block. Although each block map data may be treated in correlation with one or a plurality of files, a case that each block map data is correlated with just one file is explained in the present embodiment for a convenience sake.

In FIG. 1 again, the hard disc 15 is a non-volatile type memory for reading and writing the various data such as the map data and the like, and functions as one example of a second memory device of the present invention. In this embodiment, the hard disc 15 can be used for many purposes, and can store therein the various data such as music data, video data, an application program and the like. One portion of the hard disc 15 is assigned as a map data storage area 15b, which is as an area for storing the map data to be transferred. For example, about 1 to 2 Gigabytes in the hard disc 15 may be assigned to the map data storage area 15b. As the storage capacity of the hard disc 15 becomes the larger, the larger storage capacity may be assigned to the map data storage area 15b. In addition, the operation of transferring the map data to the hard disc 15 will be described later in detail.

The sensor unit 16 is provided with various sensors required to detect a self-car position. Actually, it contains a car speed sensor, a travel distance sensor and an azimuth sensor to detect a travel situation of the car and the like. The GPS receiver 17 receives an electric wave from a GPS (Global Positioning System) satellite, and outputs measurement data. On the basis of the sensor outputs from the sensor unit 16 and the measurement data from the GPS receiver 17, the CPU 11 synthetically detects the self-car position of the self-vehicle during traveling. Namely, the sensor unit 16 and the GPS receiver 17 function as one example of a present position detecting device of the present invention, in cooperation with the CPU 11.

The interface 18 carries out an interface operation between (i) the sensor unit 16 and the GPS receiver 17 and (ii) the CPU 11. The CPU 11 obtains the self-car position data, on the basis of the measurement data from the GPS receiver 17 and sensor outputs from the sensor unit 16. This self-car position data is correlated with the above-mentioned map data by the CPU 11, and is corrected by using a map matching process and the like.

The input device 19 is constituted by a key portion mounted on a main body of the navigation system, or a remote controller having a key portion, and sends a signal corresponding to a key input to the CPU 11 in order to carry out a desirable operation in the navigation operation.

The display device 20 is used for the navigation operation, and it is composed of, for example, a CRT, a liquid crystal display or the like. The map data is displayed on the display device 20, in various manners under a control of the display controller 21. The self-car position is displayed as a car mark overlapping with the map data. The display controller 21 generates the display data to be displayed on the display device 20. While transiently storing the display data into the buffer memory 22, the display controller 21 reads the display data from the buffer memory 22 at a proper timing, and outputs and displays it on the display device 20.

The audio process circuit 23 generates a predetermined audio signal under the control of the CPU 11. The audio signal amplified to a proper level by the audio process circuit 23 is outputted as a sound from the speaker 24 to an external portion. As such an audio signal, for example, there is a guidance voice to guide a route for the car.

Figure 4:
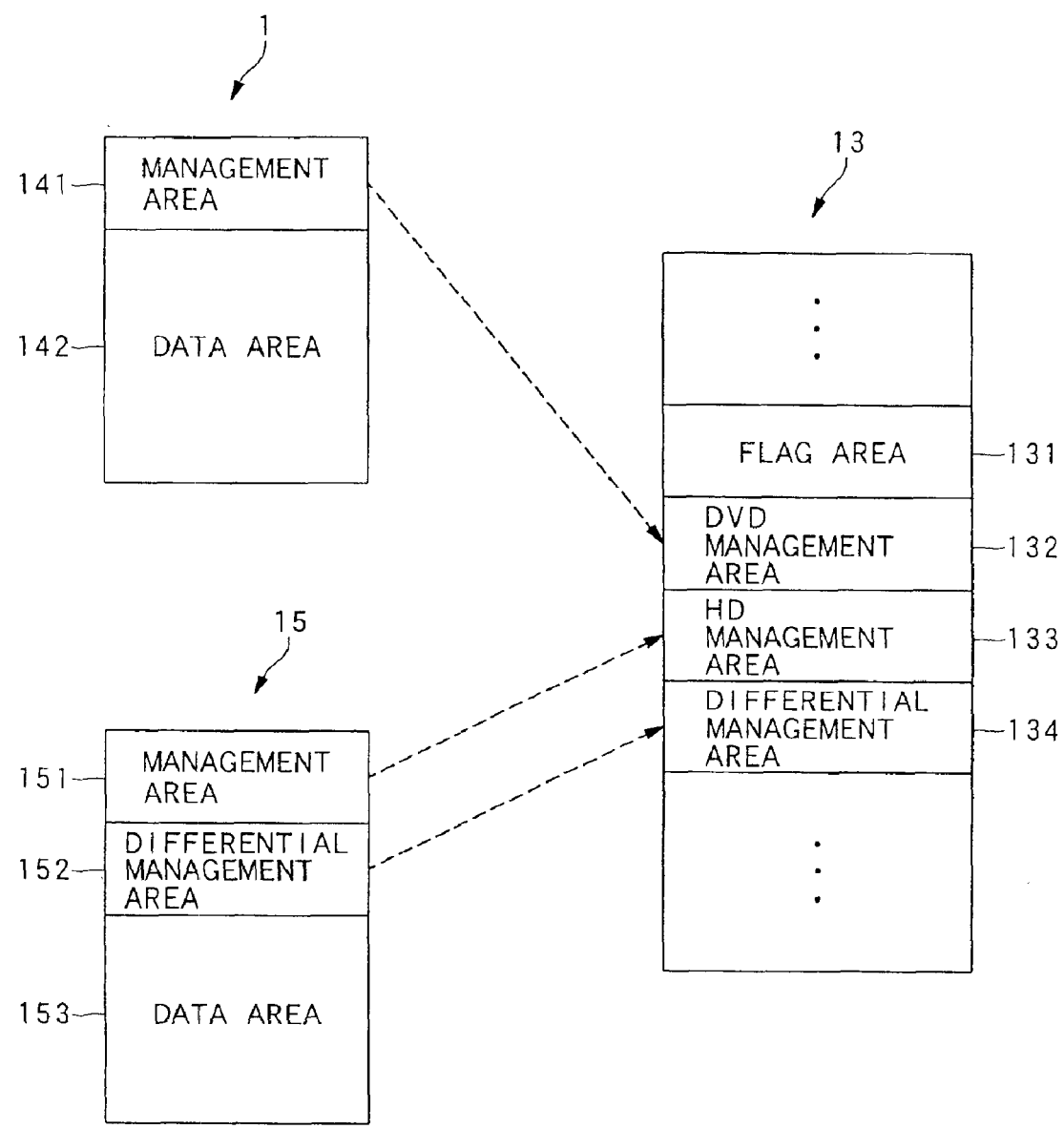
FIG. 4 is a diagram showing a structure of RAM corresponding to a map data transferring process and a reading process in comparison with the DVD-ROM band the hard disc in the embodiment.

Next, the structure of the RAM 13 in correspondence with the transferring process, the reading process etc., of the map data in the embodiment is explained with reference to FIG. 4. In FIG. 4, the storage areas related to the map data are indicated in comparison to each other as for the DVD-ROM 1, the hard disc 15 and the RAM 13.

A management area 141 of the DVD-ROM 1 is a storage area where various management information as for a plurality of block map data recorded as files in the DVD-ROM 1 is recorded. A data area 142 of the DVD-ROM 1 is a storage area where a plurality of files indicated by the management information 141 are recorded.

A management area 151 of the hard disc 15 is a storage area where various management information as for the stored files is recorded. A differential management area 152 of the hard disc 15 is a storage area where differential management information is recorded, in which different point or points between the record content of a later described HD management area 133 and a later described DVD management area 132 are extracted. A data area 153 of the hard disc 15 is a storage area where respective files are sequentially stored. Among the data area 153, the area where the block map data is recorded corresponds to the above described map data storage area 15a.

As the above mentioned differential management information, file names of (i) a file, which does not coincide with a file indicated by the HD management area 133, among files indicated by the DVD management area 132 and (ii) such a file that a file indicated by the HD management areas 133 has the date and time older than that of a file indicated by the DVD management area 132, are recorded, for example. A concrete process using the differential management information in the differential management area 134 will described later.

In the present embodiment, the management area 141 of the DVD-ROM 1 and the management area 151 of the hard disc 15 have the common data structures. As the record contents of the management areas 141 and 151, there may be included a file name of each file recorded in the respective data areas 142 and 153, data and time information indicative of the date and time when each file was updated at the latest, file size information indicative of the data size of each file, attribute information indicative of an attribute of each file and so forth.

On the other hand, the RAM 13 functions as examples of a management information memory device and a differential management information memory device of the present invention. At predetermined addresses in the RAM 13, a flag area 131, the DVD management area 132, the HD management area 133 and the differential management area 134 are prepared. The flag area 131 is a storage area where various flags required for the later described process are recorded. Those various flags include a priority flag indicating which one of the DVD-ROM drive 15 and the hard disc 15 has a priority to be accessed to thereby read out the file required for the navigation operation.

The DVD management area 132 is a storage area where the record content of the management area 141 of the DVD-ROM 1 is recorded as it is. Namely, the same function of referring to the management area 141 of the DVD-ROM 1 can be attained by referring to the DVD management area 132. In the present embodiment, at the timing when the DVD-ROM drive 14 is set or loaded to the DVD-ROM drive 14, the management information in the management area 141 is read out and copied to the DVD management area 132 of the RAM 13.

The HD management area 133 is a storage area where the record content of the management area 151 of the hard disc 15 is recorded as it is. Namely, the same function of referring to the management area 151 of the hard disc 15 can be attained by referring to the HD management area 133. For example, when turning on the electric power of the navigation system, the management information in the management area 151 of the hard disc 15 may be read out and copied to the HD management area 133 of the RAM 13. Only the portion, which corresponds to the map data storage area 15a, of the management area 151 of the hard disc 15 may be taken in to the HD management area 133.

The differential management area 134 is a storage area where the record content of the differential management area 152 of the hard disc 15 is recorded as it is. Namely, the same function of referring to the differential management area 152 of the hard disc 15 can be attained by referring to the differential management area 134. For example, when turning on the electric power of the navigation system, the differential management information in the management area 152 of the hard disc 15 may be read out and copied to the differential management area 134 of the RAM 13. If the data amount of the differential management information recorded in the differential management area 152 is too large to store it to the RAM 13, the differential management information in the differential management area 152 of the hard disc 15 may be directly referred to without storing it to the RAM 13.

Next, the process of transferring the map data to the hard disc 15 as well as the process of reading the map data from the hard disc 15 as a first embodiment of the navigation system will be described below with reference to FIG. 5 to FIG. 8. Here, the transferring process of the hard disc 15, which is performed in case that the DVD-ROM 1 storing the map data is set to the DVD-ROM drive 14 when starting the navigation operation in a car, and the reading process of the hard disc 15 or the DVD-ROM 1 during the navigation operation are explained.

Figure 5:
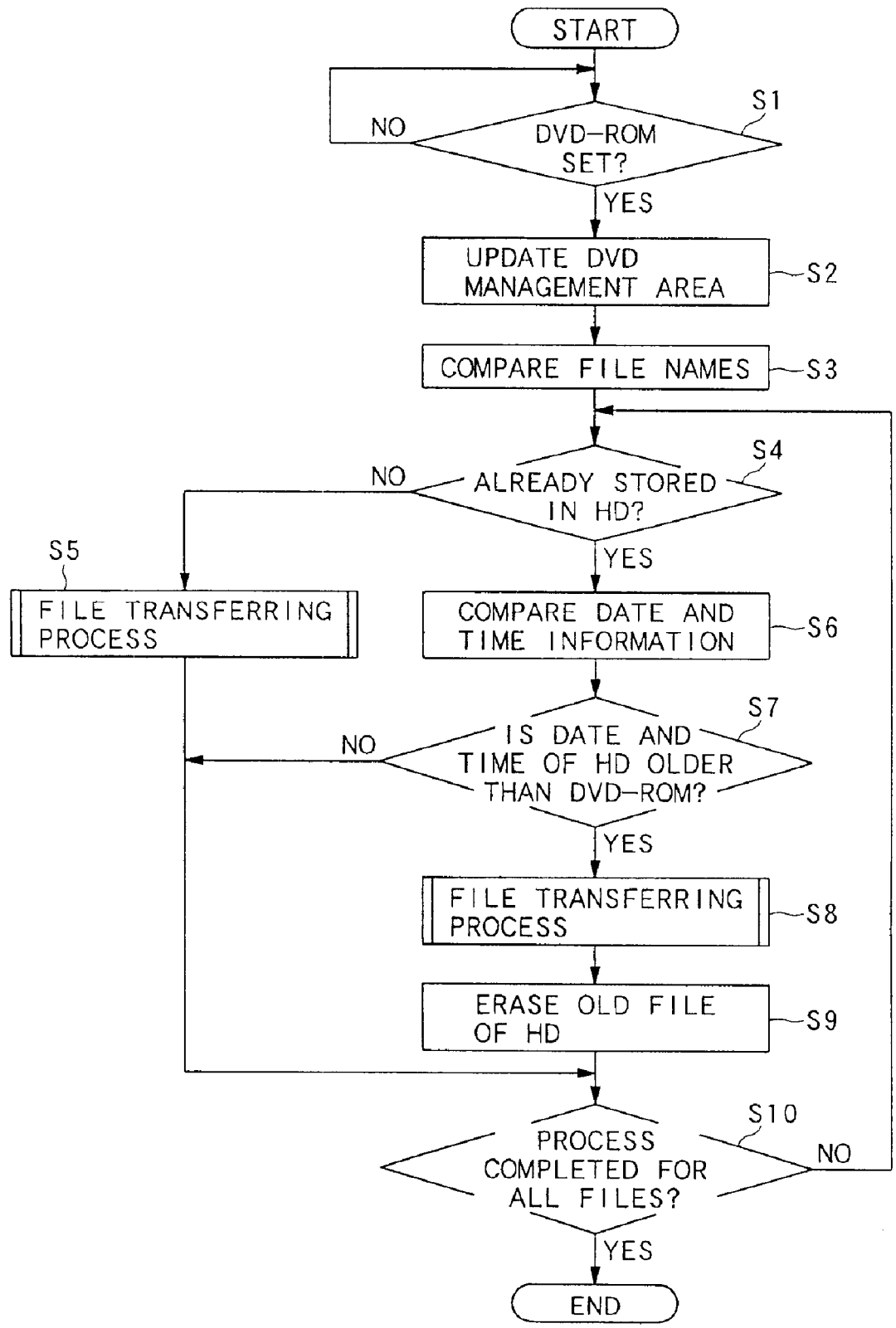
FIG. 5 is a flowchart showing a flow of a transferring process when setting the DVD-ROM in a first embodiment.

FIG. 5 is a flowchart showing the transferring process of the map data when setting the DVD-ROM 1 according to the first embodiment.

In FIG. 5, at first, it is judged whether or not the DVD-ROM 1 is set to the DVD-ROM drive 14 on the basis of the detection signal from the DVD-ROM drive 14 (step S1). According to the judgment result, if the DVD-ROM 1 is not set (step S1: NO), the judgment at the step S1 is repeated. If the DVD-ROM 1 is set (step S1: YES), the operational flow proceeds to a step S2.

Then, the DVD-ROM drive 14 is accessed, so that the record content of the management area 141 of the set DVD-ROM drive 14 is read out and is written to the DVD management area 132 of the RAM 13 to thereby update it (step S2). On the other hand, at this stage, it is assumed that the HD management area 133 has been already written, on the basis of the record content of the management area 151 of the hard disc 1 in the past.

Then, both of the DVD management area 132 and the HD management area 133 are referred to, with respect to the respective files of the block map data recorded in the DVD-ROM 1 as target files, and the file names of the target files are compared with each other. Namely, if a particular block map data is recorded in each of the DVD-ROM 1 and the hard disc 15, it is possible to find out the same file names as a result of comparison of the record contents between the DVD management area 132 and the HD management area 133.

Then, it is judged whether or not the target file of the DVD-ROM 1 is already stored in the hard disc 15 on the basis of the comparison result at the step S3 (step S4). Namely, if the file name same as that of the target file cannot be found out in the HD management area 133, the target file is not stored in the hard disc HD (step S4: NO), and the operational flow proceeds to a step S5. On the other hand, if the file name same as that of the target file can be found out in the HD management area 133, the target file is already stored in the hard disc HD (step S4: YES), and the operational flow proceeds to a step S6.

Then, at the step S5, the target file is read from the DVD-ROM 1, and the process of transferring the map data to the hard disc 15 is performed. Here, the transferring process of the map data at the step S5 is explained in detail with referring to the flowchart of FIG. 6.

Figure 6:
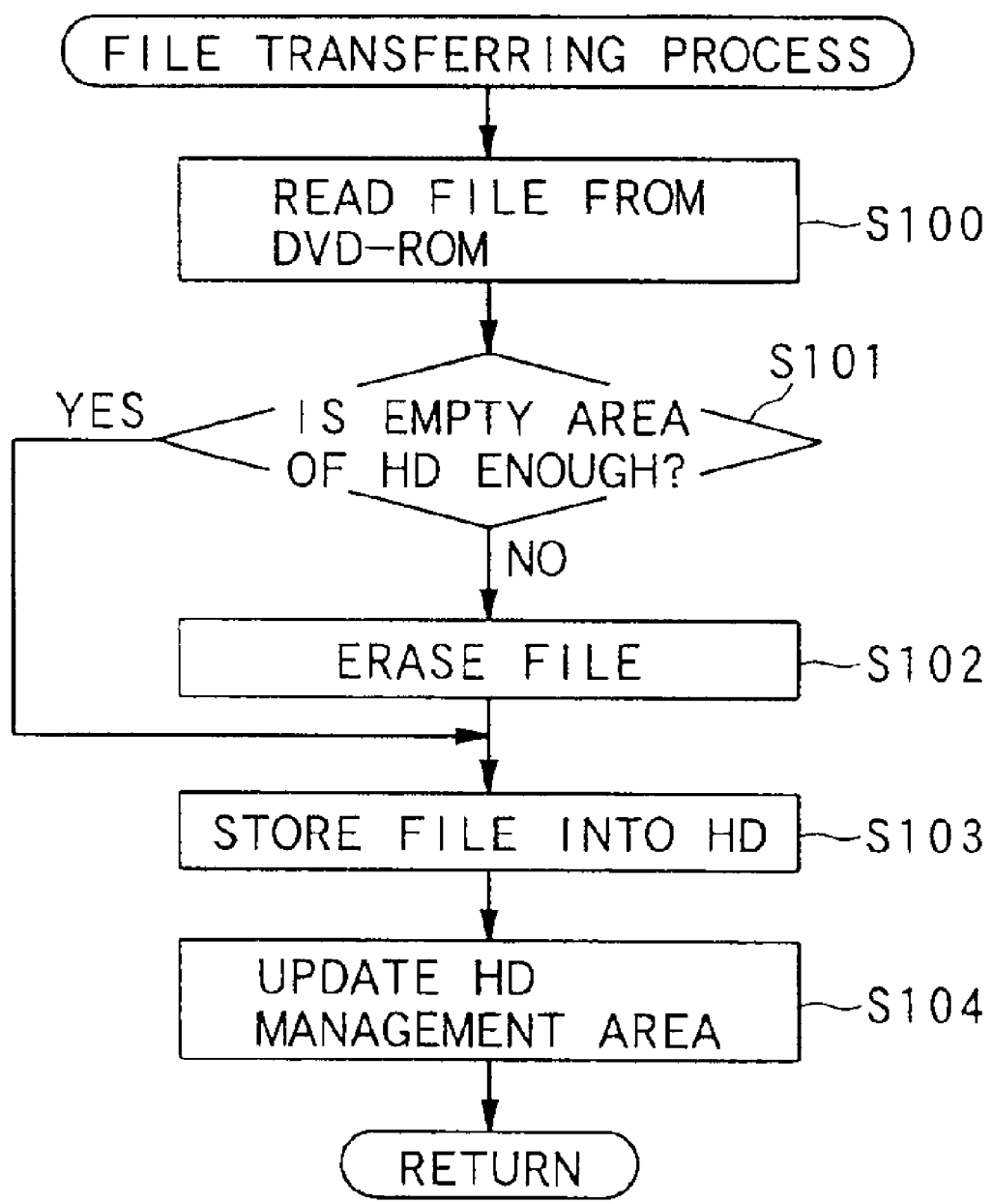
FIG. 6 is a flowchart showing the transferring process of a target file from the DVD-ROM to the hard disc in the first embodiment.

In FIG. 6, when the transferring process of the map data is started, the DVD-ROM drive 14 is accessed (step S100), so that the target file recorded on the DVD-ROM 1 is read out. The read out target file is transiently stored in the RAM 13 in order to perform the displaying process or the like.

Then, before storing the target file into the hard disc 15, it is judged whether or not the empty storage area of the map data storage area 15a is enough or not (step S101). This step is performed in order to reserve the empty storage area in the hard disc 15 beforehand since it is necessary to transfer and store the target file, which is read from the DVD-ROM 1 at the step S100, into the hard disc 15 so as to use the stored target file again. Namely, this step is performed in consideration of such a case that the new target file cannot be written into the hard disc 15 as it exceeds the storage capacity assigned to the map data storage area 15a. As a result of the judgement at the step S101, if the empty storage area is not enough (step S101: NO), one of the files in the map data storage area 15a us erased (step S102). For example, the file of the block map data corresponding to the block, which is the farthest from the self-car position or the file of the block map data whose date and time is the oldest, may be erased. By this, it becomes possible to write the new target file into the map data storage area 15a.

On the other hand, as a result of the judgement at the step S101, if the empty storage area is enough (step S101: YES), or after the step S102, the target file is transferred from the RAM 13 to the hard disc 15, to thereby write the target file into the map data storage area 15a.

Next, the management information related to the new target file is added to the management area 151 of the hard disc 15 and the HD management area 133 of the RAM 13 (step S104).

Therefore, as a result of the processes from the step S100 to the step S104, the target data is transferred and stored from the DVD-ROM 1 to the hard disc 15. Thus, after that, if the same block map data is required for the navigation operation, it is possible to read the target file from the hard disc 15.

Figure 7:
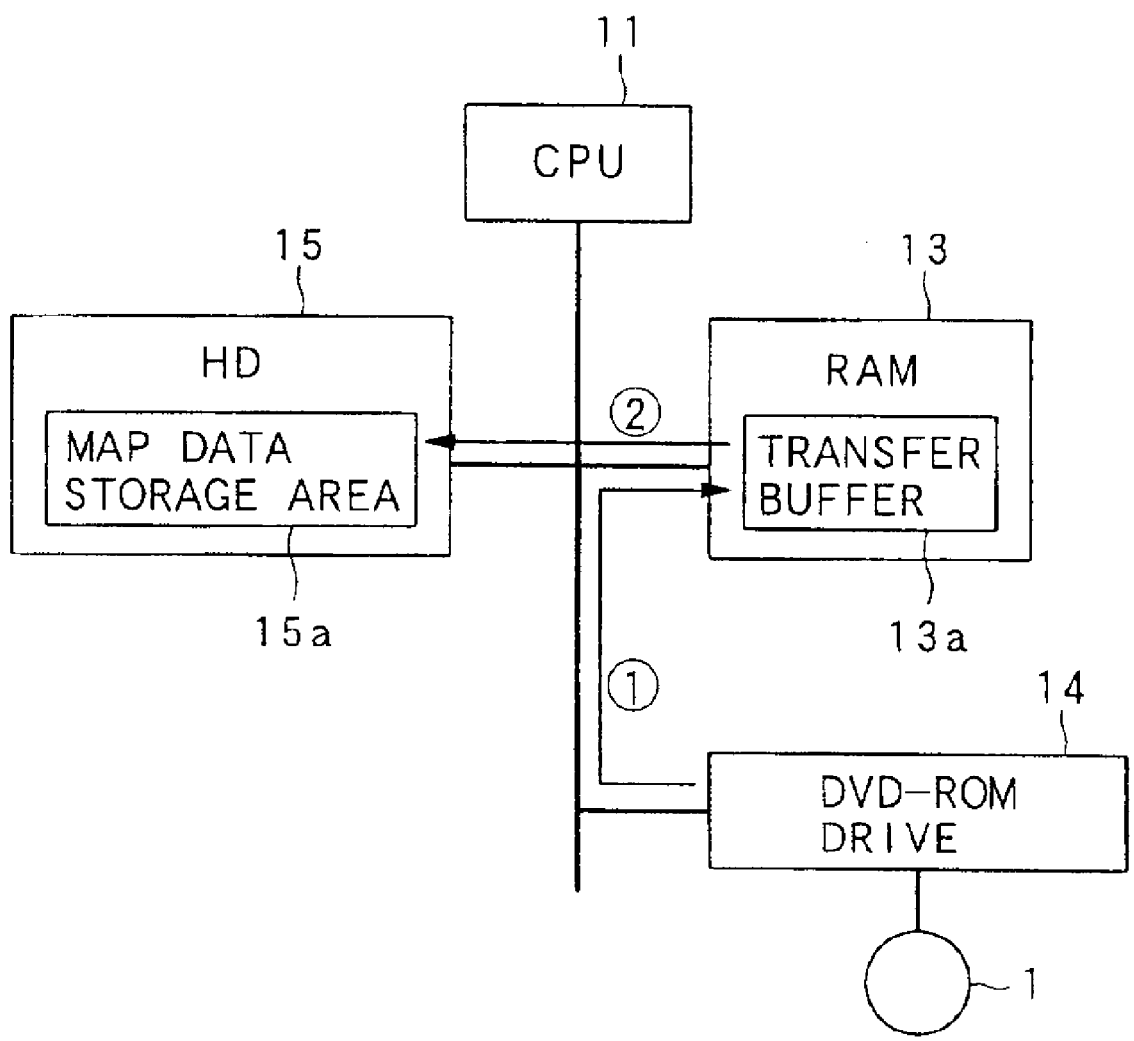
FIG. 7 is a diagram explaining the operation of transferring the target file from the DVD-ROM to the hard disc in the first embodiment.

FIG. 7 schematically shows the transferring operation of the target file from the DVD-ROM 1 to the hard disc 15. As shown in FIG. 7, after the DVD-ROM drive 14 is accessed and the target file recorded in the DVD-ROM 1 is read out, the target file is transiently stored in a transfer buffer 13a of the RAM 13. The transfer buffer 13a is a memory area on the RAM 13, which is dedicated to the transferring process and has a memory capacity equal to or more than one file. In succession to this, the hard disc 15 is accessed and the target file stored in the transfer buffer 13a is written into the map data storage area 15a at a predetermined record position thereof. The CPU 11 controls the timings of the transferring operation between the DVD-ROM drive 14 and the RAM 13 as well as the transferring operation between the RAM 13 and the hard disc 15.

In FIG. 5 again, the date and time information among the management information in the DVD management area 132 and that in the HD management information area 133 as for the same target file are compared with each other (step S6). Namely, even if the same file names are stored in the DVD management area 132 and the HD management area 133, if the updated date and time in the DVD management area 132 is different from that in the HD management area 133, there may be a case that the data contents are different from each other since the versions of the block map data are different from each other.

Then, it is judged whether or not the updated date and time of the target file in the hard disc 15 is older than that in the DVD-ROM 1, on the basis of the comparison result at the step S6 (step S7). If the target file in the hard disc 15 is judged to be older (step S7: YES), the operational flow proceeds to a step S8. On the other hand, if the target file in the hard disc 15 is not judged to be older (step S7: NO), the operational flow proceeds to a step S10.

Then, aforementioned the transferring process of the map data shown in FIG. 6 is performed (step S8), and the target file whose date and time is older in the hard disc 15 is erased (step S9). Namely, the original old target file is erased from the map data storage area 15a, and the new target file is written thereto. At this time, the management information of the erased file is also erased from the management area 151 in the hard disc 15 and the HD management area 133.

Following to the step S5, the step S7 or the step S9, it is judged whether or not the above mentioned processes are completed as for all the files corresponding to the block map data recorded in the DVD-ROM 1 (step S10). As a result of this judgment, if any one of the files remains (step S10: NO), the operational flow returns to the step S4 so as to perform the processes from the step S4 to the step S9 again. On the other hand, if the processes are completed as for all the files (step S10: YES), the processes in FIG. 5 are ended.

It is possible to construct the navigation system such that the transferring process when setting or loading the DVD-ROM 1 shown in FIG. 5 is not performed by the user's setting. For example, if the DVD-ROM 1, whose map data are totally renewed, is set to the DVD-ROM drive 14, all of the date and time information of the files of the map data in the DVD-ROM 1 are new as compared with those in the hard disc 15. Accordingly, a large volume of the files is supposed to be transferred to the hard disc 15. In this case, if the transferring process is not performed by the user's setting, it is possible to avoid such an event that it takes too long to perform the transferring operation of the map data.

Hence, it is also possible to set whether or not the map data is transferred to the hard disc 15 when the DVD-ROM 1 is exchanged, on an initialization setting picture plane of the navigation. If the transferring process is not performed by the user's setting, only the updating process of the DVD management area 132 is performed but the processes at and after the step S3 are stopped. In this case, in accordance with a later described flowchart of FIG. 8, the map data required for the navigation operation for the time being is transferred from the DVD-ROM 1 to the hard disc 15.

It is also possible to record information, which indicates a prohibition of the transferring process of the map data, in the hard disc 15 in advance, and to automatically stop the transferring process when the DVD-ROM 1 is set or loaded by the user's setting.

Figure 8:
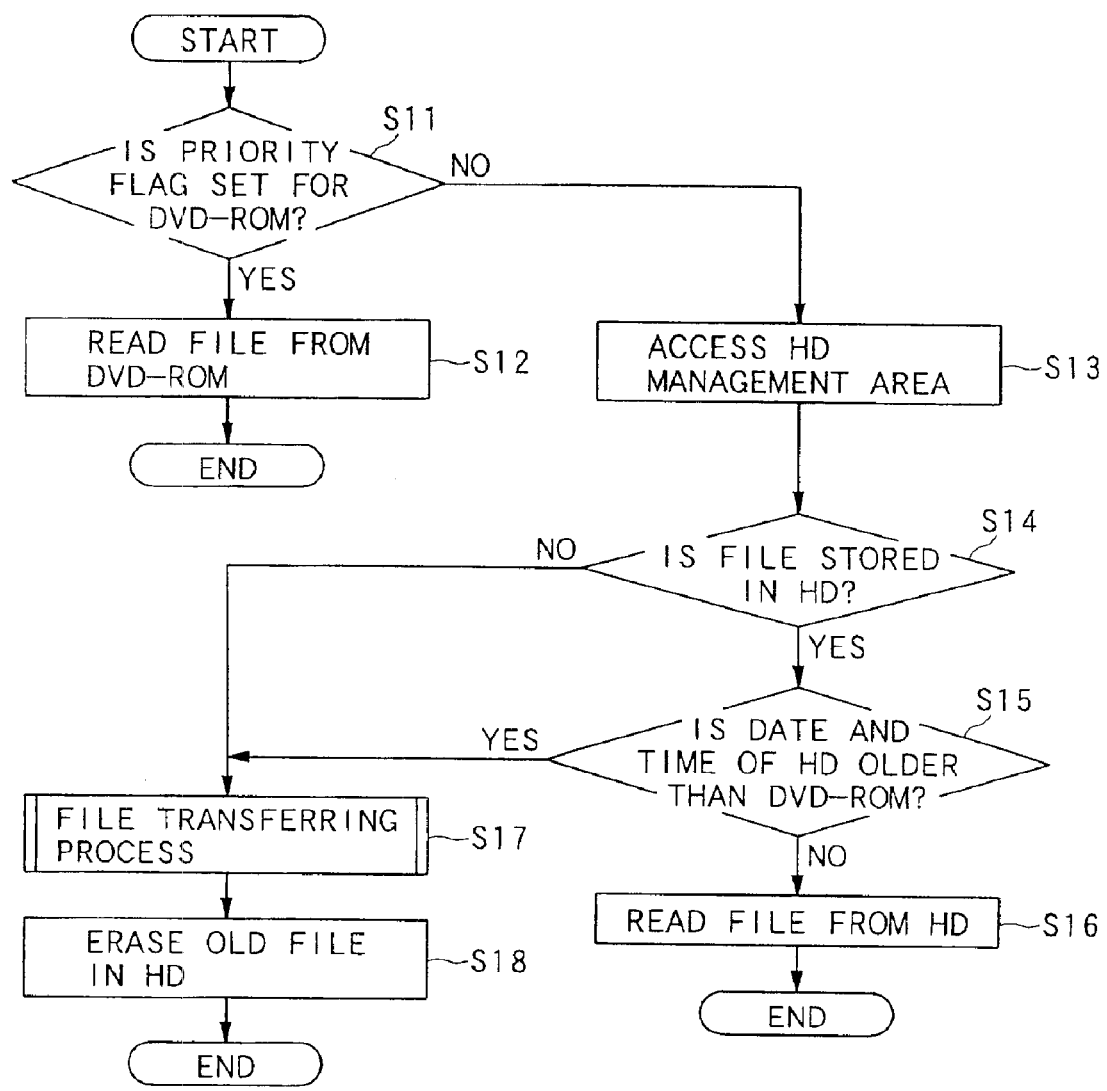
FIG. 8 is a flowchart showing the reading process of a required target file from the DVD-ROM or the hard disc in the first embodiment.

Next, FIG. 8 is a flowchart of a process of reading the target file, which corresponds to the required block map data, from the DVD-ROM 1 or the hard disc 15. Here, the process of reading the target file required for the navigation operation such as the displaying process of the display device 20 etc., is explained.

In FIG. 8, at first, it is judged, with referring to a priority flag recorded in the flag area 131 of the RAM 13, whether or not the setting of the priority flag is such that the block map data is read from the DVD-ROM 1 in priority (step S11).

This priority flag can be set by the user through the input device 19. In general, such a setting is more convenient that the priority is given to the hard disc 15, whose access speed is faster, with respect to the same kind of map data. However, there may be a case in which such a setting is more convenient that the priority is given to the DVD-ROM 1 e.g., a case in which the DVD-ROM 1 recorded with sight-seeing information corresponding to a specific usage such as the sight-seeing in a specific district in addition to the map data is preferably used. In case of the DVD-ROM 1 corresponding to the specific usage in this way, this fact may be recorded on the DVD-ROM 1, and the priority flag may be automatically set to give the priority to the DVD-ROM 1 at the time of setting or loading the DVD-ROM 1.

As a result of the judgment at the step S11, if the priority flag is set to give the priority to the hard disc 15 (step S11: NO), the operational flow branches to a step S13. On the other hand, if the priority flag is set to give the priority to the DVD-ROM 1 (step S11: YES), the operational flow branches to a step S12.

Then, at the step S12, the DVD-ROM drive 14 is accessed, and the reading process of the target file recorded on the DVD-ROM 1 is performed. The read out target file is transiently stored in the RAM 13 for the displaying process etc., and is used for the displaying process at the display controller 21 at an appropriate timing, for example. Then, the processes are ended.

On the other hand, at the step S13, the HD management area 133 of the RAM 13 is accessed, and the management information of the target file is referred to. Then, it is judged whether to not the target file for the reading process is stored in the hard disc 15, on the basis of the file name of the corresponding block map data among the management information for the target file (step S14). As a result of the judgment, if the target file is stored in the hard disc 15 (step S14: YES), the operational flow branches to a step S15. On the other hand, if the target file is not stored in the hard disc 15 (step S14: NO), the operational flow branches to a step S17.

At the step S15, it is judged whether or not the updated date and time of the target file stored in the hard disc 1 is older than that of the target file stored in the DVD-ROM 1, on the basis of the comparison result. As a result of the judgment, if the target file in the hard disc 15 is judged to be older (step S15: YES), the operational flow branches to a step S17. On the other hand, if the target file in the hard disc 15 is not judged to be older (step S15: NO), the operational flow branches to a step S16.

Then, at the step S16, the hard disc 15 is accessed, and the reading process of the target file stored therein is performed. The read out target file is transiently stored in the RAM 13, and is used for the displaying process at the display controller 21 at an appropriate timing for example. Then, the processes area ended.

On the other hand, at the step S17, the aforementioned map data transferring processed shown in FIG. 6 is performed. The read out target file is used for the displaying process for the display controller 21 at an appropriate timing for example.

Then, the target file whose date and time is old in the hard disc 15 is erased (step S18). Namely, the original old target file is erased, which is redundant with the new target file transferred from the DVD-ROM 1, from the map data storage area 15a. At this time, the management information of the erased file is also erased from the management area 151 of the hard disc 15 and the HD management area 133. Then, the processes are ended.

According to the above described first embodiment of the present invention, since the map data recorded in the DVD-ROM 1 is transferred to the hard disc 15, it is possible to hold the map data redundantly in the two different memory devices. Thus, it is possible to read out the map data required for the navigation operation selectively from the DVD-ROM 1 and the hard disc 15. For example, during the navigation operation, it becomes possible to reproduce another disc at the DVD-ROM drive 14, which realizes a comfortable navigation operation for the user. Further, whether the map data is read from the DVD-ROM 1 or the hard disc 15 can be determined in various manners, e.g., the appropriate one is selected with referring to the file names, the date and time information etc., at the time of the reading process, or one of them is fixedly selected by setting a priority flag, which improves the convenience for the user.

Next, as a second embodiment of the navigation system of the present invention, a case in which differential management information stored in a differential management area 134 of the RAM 13 is used for the reading process of the map data as well as the process at the time of setting the DVD-ROM 1 is explained with reference to FIG. 9 and FIG. 10.

Figure 9:
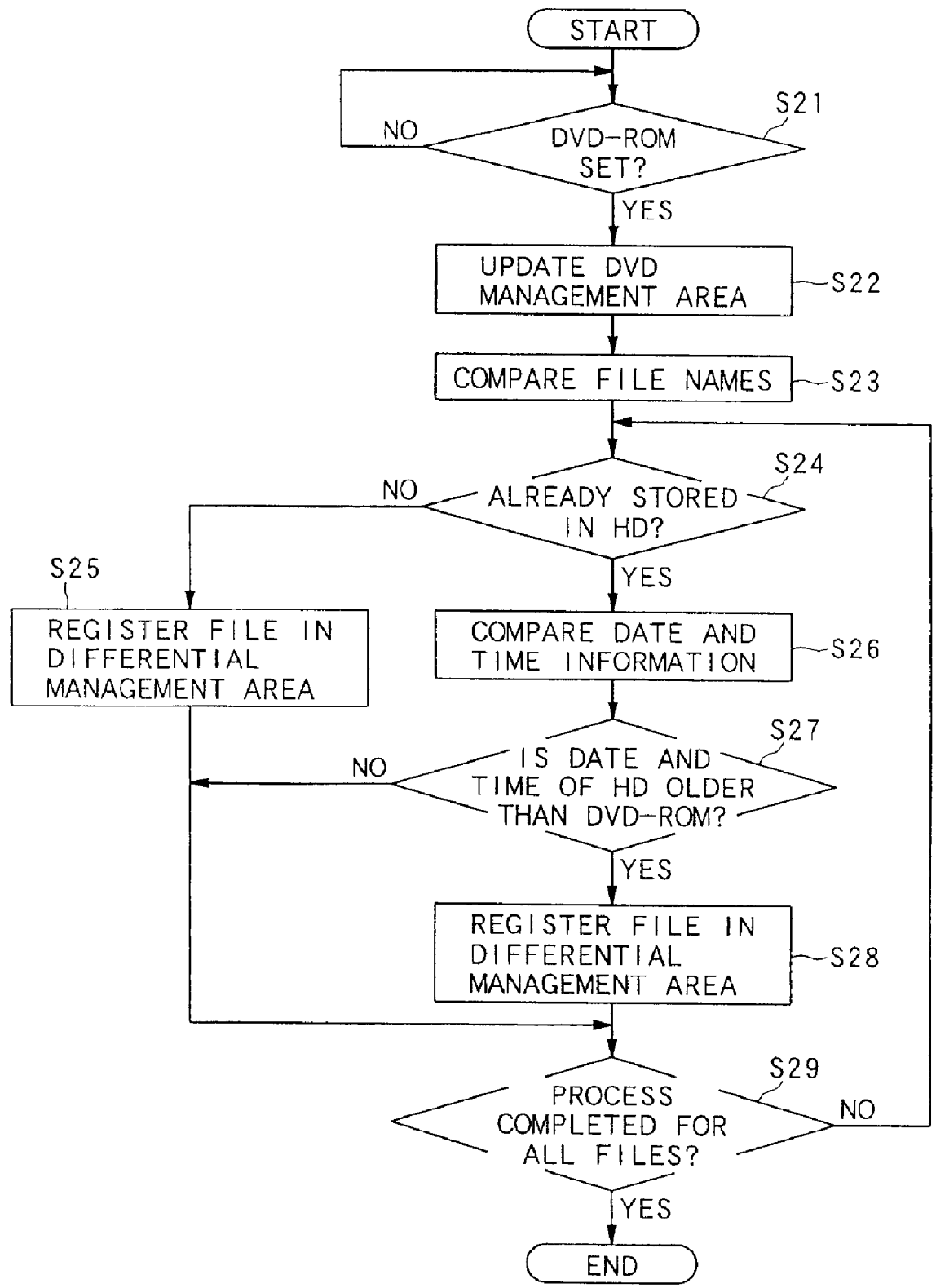
FIG. 9 is a flowchart showing a flow of a process when setting the DVD-ROM in a second embodiment.

FIG. 9 is a flowchart showing the process at the time of setting the DVD-ROM 1 in the second embodiment.

In FIG. 9, the process of judging whether or not the DVD-ROM 1 is set (step S21), the process of updating the DVD management area 132 (step S22) and the process of comparing the file names of the target files (step S23) and the process of confirming whether or not the target file is already stored in the hard disc 15 (step S24) are performed in the same manner as those at the steps S1 to S4 respectively in FIG. 5, the detailed explanations of which are omitted.

On the other hand, if the judgment result at the step S24 is "NO" i.e., if the target tile is not stored in the hard disc 15 yet (step S24: NO), the file name of the target file is registered into the differential management area 134 (step S25). Namely, as compared with the first embodiment in which the target file is transferred to the hard disc 15 at this stage, the second embodiment is different in that the target file is simply defined by the differential management information in the differential management area 134.

On the other hand, if the judgment result at the step S24 is "YES" i.e., the target file is already stored in the hard disc 15 (step S24: YES), the process of comparing the date and time information of the target file (step S26) and the process of judging whether or not the date and time information in the hard disc 15 is old of that in the DVD-ROM 1 (step S27) are performed in the same manner as the processes at the step S6 and the step S7 respectively shown in FIG. 5, the detailed explanation of which are omitted.

On the other hand, after the judgment result at the step S27 becomes "YES", the file name of the target file is registered to the differential management area 134 (step S28). At the step S28, the target file is simply defined by the differential management information in the differential management area 134 instead of transferring the map data to the hard disc 15, in the similar manner as the step S25.

At the step S29, it is judged whether or not the above mentioned processes are completed as for all the files corresponding to the block map data recorded in the DVD-ROM 1 in the similar manner as the step S9 of FIG. 5. Then, after repeating the processes at the step S24 to the step S28 as for the non-processes file or files, the processes shown in FIG. 9 are finally ended.

When all the processes in FIG. 9 are ended, the file names of the file, which is not stored in the hard disc 15, and the file, whose date and time is old even though it is stored in the hard disc 15, are listed up in the differential management area 134, among the respective files corresponding to the block map data recorded in the DVD-ROM 1. Therefore, as for the files registered in the differential management area 134, it is possible to judge that the file recorded in the DVD-ROM 1 is preferably used for the navigation operation.

Figure 10:
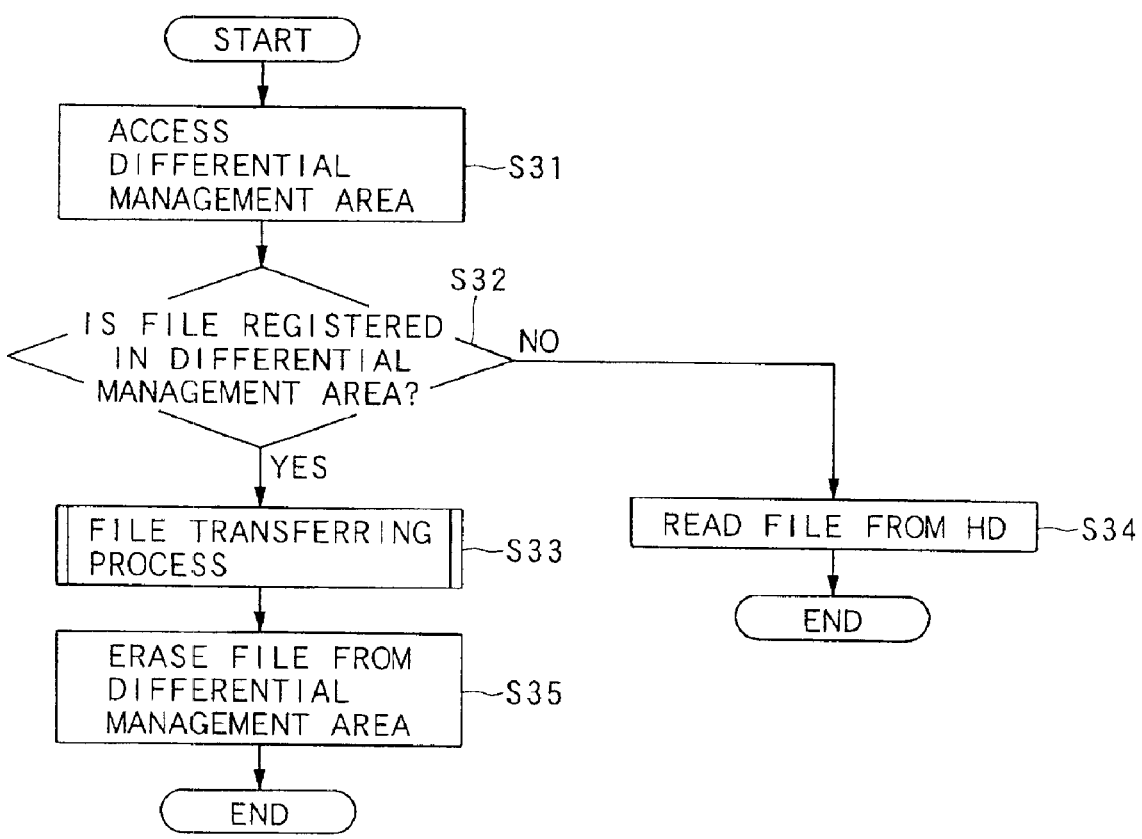
FIG. 10 is a flowchart showing the reading process of a required target file from the DVD-ROM or the hard disc in the second embodiment.

Next, FIG. 10 is a flowchart showing the reading process of the target file corresponding to the required block map data from the DVD-ROM 1 or the hard disc 15 in the second embodiment. In FIG. 10, it is assumed that the priority flag is set to give the priority to the hard disc 15.

In FIG. 10, at first, the differential management area 134 of the RAM 13 is accessed, and the management information thereof is referred to (step S31). Then, the file names are referred to, among the management information in the differential management area 134, so that it is judged whether or not the target file is registered in the differential management area 134 (step S32). If the target file is registered in the differential management area 134 (step S32: YES), the operational flow branches to a step S33. On the other hand, if the target file is not registered in the differential management area 134 (step S32: NO), the operational flow branches to a step S34. At the step S34, the target file is read from the hard disc 15, is transiently stored in the RAM 13, and is used for the display control or the like. After that the processes in FIG. 10 are ended.

At the step S33, the target file is transferred from the DVD-ROM 1 to the hard disc 15 in accordance with the flowchart shown in FIG. 6.

Then, since the target file same as that recorded in the DVD-ROM 1 is now stored in the hard disc 15, the file name of the target file is erased from the differential management area 152 in the hard disc 15 and the differential management area 134 (step S35). Then, the processes in FIG. 10 are ended. By this, when performing the processes in FIG. 9 again afterward, since the judgment result becomes "NO" at the step S 32, the target file is read from the hard disc 15.

According to the second embodiment as described above, the map data in the DVD-ROM 1 and the map data in the hard disc 15 are compared with each other, and the different management information is listed up to thereby construct the differential management information. Accordingly, if there are many common portions between the DVD-ROM 1 and the hard disc 15, it is possible to shorten the time period required for transferring the map data, while reducing the data amount required for the management. On the other hand, when one of the DVD-ROM 1 and the hard disc 15 is to be selected to read out the map data required for the navigation operation, the map data indicated by the differential management information may be suitably targeted. Thus, it is possible to speedily perform the reading process, and the navigation comfortable for the user can be realized.

In the above described embodiments, the DVD-ROM 1 is used as one memory device in which the map data is recorded while the hard disc is used as another memory device to which the map data is transferred and is stored. However, the present invention is not limited to this. For example, the present invention can be applied to such a case that the navigation system is constructed by using a plurality of memory devices, which can read out the map data.

In the above described embodiments, the DVD-ROM 1 is used as the first memory device. However, the present invention is not limited to this. For example, the map server, which is located at an external portion of the movable body, may be used as the first memory device. In this case, a communication device such as a portable telephone or the like to obtain the map data from the external map server is required. The map data obtained from the external map server is stored in the hard disc 15.

Figure 11:
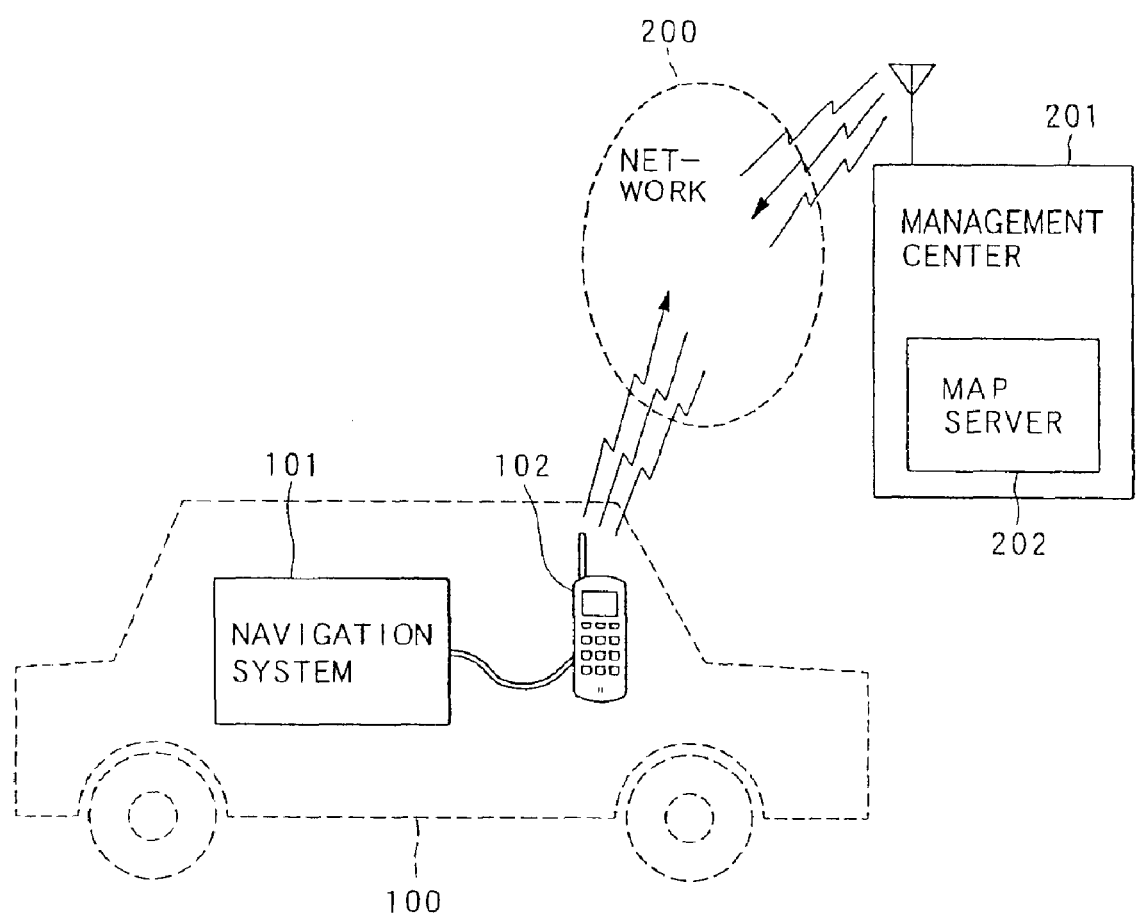
FIG. 11 is a block diagram showing a modified embodiment of the present invention.

For example, as shown in FIG. 11, the block map data may be transferred to a car 100 from a map server 202, which is equipped in a management center 201, which totally manages the map data and which is located at the outside of the car 100, through a communication network 200, in place of the record medium such as a DVD-ROM in which the map data is recorded. In this case, a portable telephone 102 may be equipped in the car 100 as one example of a communication device, so that, when the block map data to be stored into the hard disc 15 (not shown in FIG. 12) in a navigation system 101 is determined on the side of the car 100, the map server 202 at the management center 201 may be accessed by the portable telephone 102 through the communication network 200. Then, the block map data requested by the car 100 is downloaded. By transferring the map data from the map server 202 through the communication network 200 in this way, the record medium such as a DVD-ROM or the like of read only type, on which the map data is recorded, is not necessary.

The navigation system according to the embodiment is not limited to the case in which it is attained as the individual navigation apparatus. For example, it can be attained by the combination with a personal computer having a hard disc. In this case, the function of the embodiment can be attained by driving a software to carry out the transferring process of the present invention in the personal computer.

In the above described embodiment, the navigation system is equipped in a car. However, the present invention is not limited to this. For example, the navigation system of the present invention may be equipped in a movable body other than a car, or may be equipped in a portable electronic equipment such as a portable telephone, a mobile computer, a lap top computer or the like, which can be used for navigating a person who is walking. In other ward, the movable body as the target for the navigation operation may be a person using such a portable electronic equipment.

As described above, according to the present embodiment, one of a plurality of memory devices, which can read out the map data, is selected in accordance with the predetermined condition and is accessed. Then, the map data is read out from the selected memory device and is used for the navigation operation. Thus, even if the type of the map data or the date and time of the map data in one memory device is different from that in another memory device, the desirable map data can be obtained from the optimum memory device, to thereby perform the navigation operation. Further, it is possible to read the map data from the specific memory device by setting the priority flag, or the selection of the memory device to be accesses can be performed easily by holding the unific management information, so that the navigation operation can be performed while improving the convenience for the user.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.11-353632 filed on Dec. 13, 1999 including the specification, claims, drawings and summary is incorporated herein by reference in its entirety.

What is claimed is:

1. A navigation system comprising:
   a present position detecting device for detecting a present position;
   a plurality of memory devices, each of which stores the same road map data;
   a navigation controlling device for controlling a navigation operation in correspondence with the detected present position by using the road map data; and
   a road map data reading device for accessing one of the memory devices, which is selected in accordance with a predetermined condition, and reading out the road map data required for the navigation operation directly from the selected memory device.

2. A navigation system according to claim 1, wherein said road map data reading device selects the memory device to be accessed, which is indicated by a priority flag set in advance.

3. A navigation system according to claim 1, wherein said road map data reading device selects the memory device to be accessed, which is capable of reading out the road map data updated at the latest.

4. A navigation system according to claim 1, wherein said road map data reading device selects the memory device to be accessed, in accordance with management information of the road map data stored in the memory devices.

5. A navigation system according to claim 4, further comprising a management information storage device for extracting the management information from the memory devices and holding the extracted management information respectively.

6. A navigation system according to claim 5, wherein
said management information storage device holds name information indicative of a name of the road map data, and
said road map data reading device selects the memory device to be accessed, in which a presence of the road map data is confirmed in accordance with the name information.

7. A navigation system according to claim 5, wherein
said management information storage device holds date and time information indicative of date and time when the road map data is updated, and
said road map data reading device selects the memory device to be accessed, which is capable of reading out the road map data corresponding to the date and time information indicative of latest date and time.

8. A navigation system according to claim 1, further comprising a differential management information storage device for extracting the management information from the memory devices and holding differential management information indicative of a difference between the management information extracted from one memory device and that extracted from another memory device, wherein
said road map data reading device selects the memory device to be accessed in accordance with the differential management information.

9. A navigation system comprising:
a present position detecting device for detecting a present position;
a first memory device capable of reading out road map data from a record medium in which the road map data is recorded;
a second memory device of non-volatile type, capable of reading out the road map data therefrom and writing the road map data thereinto;
a navigation controlling device for controlling a navigation operation in correspondence with the detected present position by using the road map data;
a road map data transferring device for controlling said first memory device to read out the road map data from said record medium at a predetermined timing, and then transferring and storing the read out road map data to said second memory device; and
a road map data reading device for selecting one of said first and second memory devices in accordance with a predetermined condition, accessing the selected one of said first and second memory devices and reading out the road map data required for the navigation operation directly from the selected memory device.

10. A navigation system according to claim 9, further comprising a management information storage device for extracting management information of the road map data in said first memory device and management information of the road map data in said second memory device, and holding the extracted management information respectively, wherein
said road map data transferring device selects the road map data to be transferred in accordance with the management information, and
said road map data reading device selects one of said first and second memory devices in accordance with the management information.

11. A navigation system according to claim 10, wherein
said management information storage device holds name information indicative of a name of the road map data, and said road map data transferring device compares the name information of the road map data in said first memory device with that in said second memory device, and selects the road map data, which is not stored in said second memory device, as the road map data to be transferred.

12. A navigation system according to claim 10, wherein
said management information storage device holds date and time information indicative of date and time when the road map data is updated, and
said road map data transferring device compares the date and time information of the road map data in said first memory device with that in said second memory device, and selects the road map data, whose date and time in said second memory device is older than that in said first memory device, as the road map data to be transferred.

13. A navigation system according to claim 9, wherein
said road map data transferring device transfers the road map data when said record medium is set to said first memory device.

14. A navigation system according to claim 9, wherein
said second memory device is capable of writing and reading the road map data at an access speed faster than that of said first memory device.

15. A navigation system according to claim 14, wherein
said second memory device comprises a hard disc device.

16. A navigation system according to claim 9, wherein
a plurality of block road map data, which are obtained by dividing a whole map for each unit block, are recorded in said record medium,
said road map data transferring device transfers the block road map data, and
said road map data reading device reads the block road map data.

17. A navigation system comprising:
a present position detecting device for detecting a present position;
a first memory device capable of reading out map data from a record medium in which the map data is recorded;
a second memory device of non-volatile type, capable of reading out the map data therefrom and writing the map data thereinto;
a navigation controlling device for controlling a navigation operation in correspondence with the detected present position by using the map data;
a differential management information generating device for comparing management information of the map data in said first memory device with management information of the map data in said second memory device at a predetermined timing, and generating differential management information indicative of a difference between the compared management informations;
a differential management information storing device for storing the generated differential management information; and
a map data reading device for selecting one of said first and second memory devices in accordance with the differential management information, accessing the selected one of said first and second memory devices and reading out the map data required for the navigation operation therefrom.

* * * * *